United States Patent [19]
Schmidt

[11] 3,850,709

[45] Nov. 26, 1974

[54] NON-SOLVATED PARTICULATE ALUMINUM HYDRIDE COATED WITH A CYANO-CONTAINING COMPOUND USEFUL IN SOLID PROPELLANTS

[75] Inventor: Donald L. Schmidt, Midland, Mich.

[73] Assignee: The Dow Chemical Company, Midland, Mich.

[22] Filed: July 1, 1963

[21] Appl. No.: 292,166

[52] U.S. Cl. ............... 149/6, 117/121, 149/19.2, 423/645
[51] Int. Cl. ............................................. C06d 5/06
[58] Field of Search ............ 149/5, 6, 7, 17, 18, 19, 149/19.2; 117/121; 23/14; 423/645

[56] References Cited
UNITED STATES PATENTS

| | | | |
|---|---|---|---|
| 2,982,642 | 5/1961 | Rolle | 149/5 X |
| 2,995,430 | 8/1961 | Scharf | 149/19 |
| 3,002,830 | 10/1961 | Barr | 149/19 |
| 3,006,743 | 10/1961 | Fox et al. | 149/19 |
| 3,035,948 | 5/1962 | Fox | 149/87 X |
| 3,070,469 | 12/1962 | Jenkin | 149/5 |

*Primary Examiner*—Benjamin R. Padgett
*Attorney, Agent, or Firm*—C. Kenneth Bjork

EXEMPLARY CLAIM

3. A process for treating the surface of a substantially non-solvated particulate aluminum hydride which comprises;
   a. contacting a substantially non-solvated particulate aluminum hydride with a cyano group containing compound, said cyano group containing compound being a member selected from the group consisting essentially of aliphatic nitriles, aromatic nitriles, hyrodgen cyanide and cyanogen, and
   b. maintaining said aluminum hydride and said cyano group containing compound in contact for a predetermined period of time thereby to provide a surface coating of said cyano group containing compound on said aluminum hydride.

6 Claims, No Drawings

NON-SOLVATED PARTICULATE ALUMINUM HYDRIDE COATED WITH A CYANO-CONTAINING COMPOUND USEFUL IN SOLID PROPELLANTS

This invention relates to solid propellants and more particularly is concerned with a treatment for substantially non-solvated, particulate aluminum hydride which markedly improves its compatibility against degradation during storage by reaction with other ingredients of the propellants and to the treated aluminum hydride composition itself.

Novel crystalline forms of non-solvated aluminum hydride as disclosed in copending applications Ser. No. 179,509, filed Mar. 8, 1962 and Ser. No. 234,277, filed Oct. 23, 1962, have been found to be particularly suitable for use as fuels in rocket propellant formulations. These products however many times when incorporated into a solid propellant initially undergo an initial reaction, usually with the plasticizer, e.g., trimethylol ethane trinitrate. This reaction is accompanied by the release of gases which form detrimental gas pockets and voids in the propellant grain.

Now, unexpectedly it has been found that the compatibility of the useful substantially non-solvated aluminum hydride fuel component in certain solid propellants is markedly increased by reacting with, or bonding to the surface of the aluminum hydride, a cyano ($-C \equiv N$) group prior to incorporation of the aluminum hydride into the propellant formulation.

The total amount of coating provided on the aluminum hydride, expressed as carbon from the treating compound, ranges from about 0.1 to about 10 percent of the total sample weight. The actual amount of carbon present on a specific treated aluminum hydride depends on the crystal size of the hydride product and time of exposure to the cyano group containing reactant. Ordinarily the hydride is contacted with the cyano compound for a period of time of from about several minutes to about several hours or more. In general the amount of total carbon present on the particulate aluminum hydride increases as the particle size of the hydride decreases.

The cyano group can be provided by any of a variety of compounds possessing this radical. Particularly suitable reactants are aliphatic and aromatic nitriles; hydrogen cyanide and cyanogen.

The treatment of the substantially non-solvated aluminum hydride with the cyano group containing compound is accomplished by contacting the two materials for a predetermined period of time. With liquid materials, conveniently the aluminum hydride is immersed in the cyano compound. With gaseous materials or volatile liquids, the hydride can be placed in an atmosphere of the coating material or exposed to a gas stream of the cyano group containing compound. With solid cyano group containing compounds, the material can be dissolved in an inert solvent and this solution then used to contact the aluminum hydride.

The following Examples will serve to further illustrate the present invention, but are not meant to limit it thereto.

EXAMPLE 1

Particulate-aluminum hydride was slowly added to substantially anhydrous acrylonitrile under a nitrogen atmosphere in a dry box at room temperature (about 20°–25° C.). The amounts of aluminum hydride and acrylonitrile employed were such that in the final reaction medium the liquid acrylonitrile covered the solid hydride. The resulting mixture was allowed to stand for about 10 minutes after which time the acrylonitrile was filtered from the hydride. The so-treated hydride material was dried at room temperature at about 0.1 millimeter Hg pressure absolute. This treatment produced a coated product wherein carbon from the acrylonitrile reactant was found to be about 0.1 percent by weight of the $AlH_3$.

The compatibility of the so-coated material with the widely used trimethylol ethane trinitrate plasticizer, as determined by gas evolution, was evaluated in a modified Taliani apparatus. In this test, the plasticizer and aluminum hydride sample were weighed into a sample tube which was then connected to a mercury manometer. The sample was immersed in a constant temperature bath. The system was evacuated and purged with nitrogen, given a half-hour equilibration period at the test temperature and the mercury brought to a fiducial mark. The initial monometric and barometric readings were taken as well as periodic readings over the test period. The rate of gas evolution, indications of reaction and mix incompatibility, expressed as pressure change (Log mm Hg) for both the acrylonitrile coated sample and a second sample of uncoated aluminum hydride of the same product for a test period of 20 hours as determined at 40° C. are presented in Table I.

Table I

| Time on Test (hrs.) | Pressure Change - Log mm Hg | |
|---|---|---|
| | Uncoated $AlH_3$ | Coated |
| 1 | 60 | 7 |
| 2 | 80 | 11 |
| 3 | 100 | 15 |
| 4 | 110 | 16 |
| 10 | 140 | 23 |
| 20 | 180 | 35 |

The marked improvement in compatibility of acrylonitrile coated aluminum hydride with the plasticizer over the uncoated material readily is apparent from these results.

A propellant formulation of about 12.5 percent plastisol grade nitrocellulose, about 37.5 percent trimethylol ethane trinitrate plasticizer, about 30 percent ammonium perchlorate and about 20 percent of the acrylonitrile coated aluminum hydride was formulated into a propellant grain and employed in a 50 gram end-burning motor. This grain exhibited a density of about 1.45 g./cc.

A second propellant grain of this same composition was prepared using the same type of aluminum hydride but which had not been treated. This grain had a density of about 1.15 g./cc indicative of mix incompatibility and gassing.

EXAMPLE 2

A practical grade propionitrile or acrylonitrile was dried by passage through a 100 cm. column of dry Dowex 50 ion exchange resin in the potassium salt form.

A quantity of glass wool was placed in the bottom of a 16 ounce glass jar and the wool soaked with one of the nitriles. Aluminum hydride samples were placed in 50 milliliter beakers suspended above the glass wool.

The jar was then sealed and the aluminum hydride maintained in the presence of the cyano compound for a predetermined period of time. The so-treated aluminum hydride was removed from the jar, slurried with a portion of the liquid nitrile and immediately filtered. The resulting aluminum hydride product was dried at room temperature under reduced pressure.

In all cases, X-ray diffraction analysis of the cyano material treated product indicated substantially no change from the untreated sample. Elemental chemical analyses for carbon, aluminum and hydrogen were run to determine the effectiveness of coating formation as denoted by increase in carbon content of the treated sample. Table II summarizes the analytical results obtained for a number of different samples after various treatment times. Analyses of the same material in the untreated state (controls) are included for comparative evaluation.

Table II

| Run No. | Treating Agent | Time of Treatment | Untreated Control | | | Treated | | |
|---|---|---|---|---|---|---|---|---|
| | | | C % | H % | Al % | C % | H % | Al % |
| 1a | — | — | 0.2 | 9.8 | 87.2 | — | — | — |
| 1b | propionitrile | 1 hr. | — | — | — | 4.0 | 9.5 | 82.0 |
| 2a | — | — | 0.3 | 9.8 | 87.1 | — | — | — |
| 2b | propionitrile | 48 hrs. | — | — | — | 5.0 | 9.3 | 79.8 |
| 3a | — | — | 0.3 | 9.7 | 87.3 | — | — | — |
| 3b | acrylonitrile | 1 hr. | — | — | — | 2.9 | 9.5 | 82.0 |
| 4a | — | — | 0.3 | 9.7 | 87.3 | — | — | — |
| 4b | acrylonitrile | 48 hrs. | — | — | — | 6.8 | 9.4 | 77.25 |

Qualitative studies were carried out to determine the compatibility of these uncoated and coated aluminum hydride samples with a number of plasticizers used in solid propellant systems. The aluminum hydride materials were admixed with either triethylene glycol dinitrate, diethylene glycol dinitrate or trimethylol ethane trinitrate plasticizer and the resulting fresh mixtures watched for the appearance of gas bubbles indicative of reaction and non-compatibility. The uncoated aluminum hydride samples were found to give immediate gas bubbles upon mixing with the plasticizer, this being most pronounced with the trimethylol ethane trinitrate. In all cases there was either substantial reduction or virtual elimination of gas bubble formation when the cyano coated aluminum hydride was mixed with the plasticizer.

In a manner similar to that described for the foregoing examples, hydrogen cyanide, cyanogen, acetonitrile, beta-butenonitrile, -hydroxyisobutyronitrile, benzonitrile, caprylonitrile, tolunitriles, naphthonitriles, m-nitrobenzonitrile, p-chlorobenzonitrile, β-phenylpropionitrile, glutaronitrile, p-bromobenzonitrile, and the like can be used in the treatment of substantially non-solvated aluminum hydride.

Although I do not intend to be bound by any theory or mechanism of operation or reaction of the present invention, one projected theory is that the surface of the aluminum hydride reacts with the cyano group in accordance with the following reaction:

$$-C{\equiv}N + H-Al \longrightarrow -C{=}N-Al$$
$$\phantom{-C{=}N-}|$$
$$\phantom{-C{=}N-}H$$

The so-bonded cyano group serves to effectively screen the surface of the hydride.

Various modifications can be made in the present invention without departing from the spirit or scope thereof for it is understood that I limit myself only as defined in the appended claims.

I claim:

1. A substantially non-solvated particulate aluminum hydride having a surface coating of a cyano group containing compound, said cyano group containing compound being a member selected from the group consisting essentially of aliphatic nitriles, aromatic nitriles, hydrogen cyanide and cyanogen.

2. A substantially non-solvated particulate aluminum hydride having a surface coating of acrylonitrile, said coating ranging, expressed as a function of carbon content of said acrylonitrile compound, from about 0.1 to about 10 per cent of the weight of the coated aluminum hydride product.

3. A process for treating the surface of a substantially non-solvated particulate aluminum hydride which comprises:
   a. contacting a substantially non-solvated particulate aluminum hydride with a cyano group containing compound, said cyano group containing compound being a member selected from the group consisting essentially of aliphatic nitriles, aromatic nitriles, hydrogen cyanide and cyanogen, and
   b. maintaining said aluminum hydride and said cyano group containing compound in contact for a predetermined period of time thereby to provide a surface coating of said cyano group containing compound on said aluminum hydride.

4. A process for treating the surface of a substantially non-solvated particulate aluminum hydride which comprises;
   a. contacting a substantially non-solvated particulate aluminum hydride with acrylonitrile,
   b. maintaining said aluminum hydride and said nitrile in contact for a predetermined period of time thereby to provide a surface coating of said nitrile on said aluminum hydride, and
   c. separating the coated aluminum hydride from said nitrile.

5. A substantially non-solvated particulate aluminum hydride having a surface coating of propionitrile, said coating ranging, expressed as a function of carbon content of said propionitrile, from about 0.1 to about 10 percent of the weight of the coated aluminum hydride product.

6. A process for treating the surface of a substantially non-solvated particulate aluminum hydride which comprises;
   a. contacting a substantially non-solvated particulate aluminum hydride with propionitrile,
   b. maintaining said aluminum hydride and said nitrile in contact for a predetermined period of time thereby to provide a surface coating of said nitrile on said aluminum hydride, and
   c. separating the coated aluminum hydride from said nitrile.

* * * * *